(12) United States Patent
Aoyama et al.

(10) Patent No.: US 11,040,560 B2
(45) Date of Patent: Jun. 22, 2021

(54) WASTE PAPER RECYCLING APPARATUS AND WASTE PAPER RECYCLING METHOD

(71) Applicant: SEIKO EPSON CORPORATION, Tokyo (JP)

(72) Inventors: Tetsuya Aoyama, Shiojiri (JP); Shinichi Kato, Matsumoto (JP); Shigemi Wakabayashi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/695,287

(22) Filed: Nov. 26, 2019

(65) Prior Publication Data

US 2020/0164673 A1 May 28, 2020

(30) Foreign Application Priority Data

Nov. 27, 2018 (JP) .............................. JP2018-221158
Jan. 31, 2019 (JP) .............................. JP2019-015649

(51) Int. Cl.
*B41M 5/00* (2006.01)
*D21H 11/14* (2006.01)

(52) U.S. Cl.
CPC ........... *B41M 5/0017* (2013.01); *D21H 11/14* (2013.01)

(58) Field of Classification Search
CPC ............................. B41M 5/0017; D21H 11/14
USPC .......................................................... 347/21
See application file for complete search history.

(56) References Cited

U.S. PATENT DOCUMENTS

| | | |
|---|---|---|
| 3,200,005 A | 8/1965 | Bauer |
| 3,963,843 A | 6/1976 | Hitchmough et al. |
| 5,225,047 A | 7/1993 | Graef et al. |
| 5,252,275 A | 10/1993 | Sultze et al. |
| 5,437,418 A | 8/1995 | Graef et al. |
| 5,865,950 A | 2/1999 | Vinson et al. |
| 5,944,954 A | 8/1999 | Vinson et al. |
| 6,207,734 B1 | 3/2001 | Vinson et al. |
| 6,436,231 B1 | 8/2002 | Graef et al. |

(Continued)

FOREIGN PATENT DOCUMENTS

| | | |
|---|---|---|
| EP | 1310593 A1 | 5/2003 |
| EP | 2857213 A1 | 4/2015 |

(Continued)

OTHER PUBLICATIONS

U.S. Appl. No. 16/695,261, filed Nov. 26, 2019 in the name of Aoyama et al.

(Continued)

*Primary Examiner* — Huan H Tran
*Assistant Examiner* — Alexander D Shenderov
(74) *Attorney, Agent, or Firm* — Oliff PLC

(57) ABSTRACT

A waste paper recycling apparatus includes a liquid ejection device which receives a first liquid and a second liquid different from the first liquid; a receiving portion receiving a selection operation which selects one of the first liquid and the second liquid which is adhered to a predetermined region of a sheet containing fibers formed from waste paper; and a control portion which controls the liquid ejection device to adhere the liquid selected by the selection operation to the predetermined region. In the waste paper recycling apparatus, the first liquid contains a binder which binds fibers together, and the second liquid contains a pigment and a binder which binds fibers together.

11 Claims, 8 Drawing Sheets

(56) References Cited

U.S. PATENT DOCUMENTS

| | | | |
|---|---|---|---|
| 6,838,401 B1 | 1/2005 | Murayama et al. | |
| 8,882,965 B2 | 11/2014 | Yamagami et al. | |
| 9,403,393 B2 | 8/2016 | Aoyama et al. | |
| 2005/0249895 A1* | 11/2005 | Sisler | C08G 65/3322 |
| | | | 428/32.34 |
| 2006/0038871 A1 | 2/2006 | Chen et al. | |
| 2007/0267163 A1* | 11/2007 | Tamai | D21C 5/02 |
| | | | 162/261 |
| 2014/0364548 A1* | 12/2014 | Everhardus | C08K 13/00 |
| | | | 524/166 |
| 2015/0091974 A1 | 4/2015 | Aoyama et al. | |
| 2016/0193857 A1 | 7/2016 | De Mondt et al. | |
| 2016/0207307 A1 | 7/2016 | De Mondt et al. | |
| 2016/0375718 A1 | 12/2016 | Van Garsse et al. | |

FOREIGN PATENT DOCUMENTS

| | | |
|---|---|---|
| JP | H10-86247 A | 4/1998 |
| JP | 2003-170579 A | 6/2003 |
| JP | 2006-002296 A | 1/2006 |
| JP | 2007-130875 A | 5/2007 |
| JP | 2010-076118 A | 4/2010 |
| JP | 2011-212255 A | 10/2011 |
| JP | 2012-144826 A | 8/2012 |
| JP | 2013-107221 A | 6/2013 |
| WO | 93/14264 A1 | 7/1993 |
| WO | 97/44526 A1 | 11/1997 |

OTHER PUBLICATIONS

U.S. Appl. No. 16/695,527, filed Nov. 26, 2019 in the name of Aoyama.

U.S. Appl. No. 16/695,680, filed Nov. 26, 2019 in the name of Aoyama et al.

Sep. 29, 2020 Office Action Issued in U.S. Appl. No. 16/695,527.

Apr. 5, 2021 Office Action issued in U.S. Appl. No. 16/695,527.

* cited by examiner

|  |  | LIQUID E1 | LIQUID E2 | LIQUID E3 | LIQUID E4 |
|---|---|---|---|---|---|
|  | BINDER | 20 | 20 | 20 | 20 |
| PIGMENT | CALCIUM CARBONATE | — | — | 10 | — |
|  | SILICA | — | — | — | 10 |
|  | C.I. PIGMENT BLUE 15 | — | 5 | — | — |
|  | PENETRANT | 5 | 5 | 5 | 5 |
|  | MOISTURIZER | 5 | 5 | 5 | 5 |
|  | WATER | BALANCE | BALANCE | BALANCE | BALANCE |
|  | TOTAL | 100 | 100 | 100 | 100 |

FIG. 9

|  |  | SHEET 1 | SHEET 2 | SHEET 3 | SHEET 4 | SHEET 5 | SHEET 6 | SHEET 7 | SHEET 8 | SHEET 9 | SHEET 10 | SHEET 11 | SHEET 12 |
|---|---|---|---|---|---|---|---|---|---|---|---|---|---|
| PULP BASIS WEIGHT [g/m²] | | 70 | 70 | 70 | 70 | 70 | 120 | 120 | 120 | 170 | 170 | 170 | 170 |
| APPLICATION AMOUNT [g/m²] | LIQUID E1 | 20 | — | — | — | — | 40 | 20 | 20 | 100 | 40 | 40 | 40 |
| | LIQUID E2 | — | 20 | — | — | — | — | — | — | — | — | — | — |
| | LIQUID E3 | — | — | 40 | — | 40 | — | 50 | 50 | — | 60 | — | 60 |
| | LIQUID E4 | — | — | — | 40 | 20 | — | — | 30 | — | — | 60 | 60 |
| BASIS WEIGHT OF SHEET [g/m²] | | 74 | 74 | 82 | 82 | 88 | 128 | 139 | 148 | 190 | 196 | 196 | 214 |
| TYPE | | REGULAR SHEET | REGULAR SHEET | EXCLUSIVE SHEET | EXCLUSIVE SHEET | EXCLUSIVE SHEET | REGULAR SHEET | EXCLUSIVE SHEET | EXCLUSIVE SHEET | REGULAR SHEET | EXCLUSIVE SHEET | EXCLUSIVE SHEET | EXCLUSIVE SHEET |
| SIZE | | A3 | A3 | A3 | A3 | A3 | A3 | A3 | A3 | NAME CARD | NAME CARD | NAME CARD | NAME CARD |
| QUALITY | IMAGE QUALITY | C | C | B | A | A | C | B | A | C | B | A | A |
| | DEGREE OF WHITENESS | C | C | A | B | A | C | A | A | C | A | B | A |

FIG. 10

| PRODUCTION ORDER | EXAMPLE 1 | | EXAMPLE 2 | | EXAMPLE 3 | | EXAMPLE 4 | | EXAMPLE 5 | | EXAMPLE 6 | | EXAMPLE 7 | |
|---|---|---|---|---|---|---|---|---|---|---|---|---|---|---|
| | TYPE | NUMBER OF SHEETS | TYPE | NUMBER OF SHEETS | TYPE | NUMBER OF SHEETS | TYPE | NUMBER OF SHEETS | TYPE | NUMBER OF SHEETS | TYPE | NUMBER OF SHEETS | TYPE | NUMBER OF SHEETS |
| 1 | SHEET 1 | 40 | SHEET 7 | 10 | SHEET 3 | 5 | SHEET 6 | 40 | SHEET 1 | 20 | SHEET 1 | 20 | SHEET 3 | 5 |
| 2 | SHEET 3 | 10 | SHEET 8 | 40 | SHEET 6 | 30 | SHEET 8 | 2 | SHEET 2 | 20 | SHEET 3 | 15 | SHEET 6 | 25 |
| 3 | | | | | SHEET 8 | 5 | SHEET 7 | 2 | SHEET 3 | 10 | SHEET 2 | 15 | SHEET 8 | 5 |
| 4 | | | | | SHEET 9 | 5 | SHEET 3 | 2 | | | | | SHEET 9 | 5 |
| 5 | | | | | SHEET 10 | 5 | SHEET 1 | 2 | | | | | SHEET 11 | 5 |
| 6 | | | | | | | SHEET 5 | 2 | | | | | SHEET 12 | 5 |
| TOTAL NUMBER | | 50 | | 50 | | 50 | | 50 | | 50 | | 50 | | 50 |

WASTE PAPER RECYCLING APPARATUS AND WASTE PAPER RECYCLING METHOD

The present application is based on, and claims priority from JP Application Serial Number 2018-221158, filed Nov. 27, 2018 and JP Application Serial Number 2019-015649, filed Jan. 31, 2019, the disclosures of which are hereby incorporated by reference herein in their entirety.

BACKGROUND

1. Technical Field

The present disclosure relates to a waste paper recycling apparatus and a waste paper recycling method.

2. Related Art

In recent years, in view of environmental protection and the like, recycled paper recycled from waste paper has been increasingly in demand. In waste paper recycling techniques therefor, for example, in order to increase the degree of whiteness, a pigment has been used. For example, JP-A-2010-76118 has disclosed recording paper which includes a coating layer primarily containing a pigment and a binder on one surface of a sheet-shaped substrate.

When the recycled paper as described above is manufactured, in accordance with a user's request, it has been required that the paper quality is changed between regions of recycled paper, and an arbitrary number of the regions is manufactured. In addition, the paper quality indicates, for example, the degree of whiteness, a desired chromaticity, or a print quality of an image printed by an ink jet printer.

SUMMARY

A waste paper recycling apparatus according to an aspect of the present disclosure comprises: a liquid ejection device which receives a first liquid and a second liquid different from the first liquid; a receiving portion receiving a selection operation which selects one of the first liquid and the second liquid which is adhered to a predetermined region of a sheet containing fibers formed from waste paper; and a control portion which controls the liquid ejection device to adhere the liquid selected by the selection operation to the predetermined region. In the waste paper recycling apparatus described above, the first liquid contains a binder which binds fibers together, and the second liquid contains a pigment and a binder which binds fibers together.

In the waste paper recycling apparatus according to the aspect, the liquid ejection device may receive a third liquid different from the first liquid and the second liquid, the selection operation may select one of the first liquid, the second liquid, and the third liquid which is adhered to the predetermined region, and the third liquid may contain a binder which binds fibers together and a pigment different from that of the second liquid.

The waste paper recycling apparatus according to the aspect may further comprise a transport portion which transports the sheet, the liquid ejection device may include a plurality of nozzle holes which eject the second liquid, the nozzle holes may be aligned in a direction intersecting a transport direction of the sheet to form lines, and the lines may be aligned in the transport direction.

A waste paper recycling apparatus according to another aspect of the present disclosure comprises: a first liquid ejection device which receives a first liquid; a second liquid ejection device which receives a second liquid different from the first liquid; a receiving portion receiving a selection operation which selects one of the first liquid and the second liquid which is adhered to a predetermined region of a sheet containing fibers formed from waste paper; and a control portion which controls the first liquid ejection device and the second liquid ejection device to adhere the liquid selected by the selection operation to the predetermined region. In the waste paper recycling apparatus described above, the first liquid contains a binder which binds fibers together, and the second liquid contains a pigment and a binder which binds fibers together.

In the waste paper recycling apparatus according to the aspect described above, the first liquid ejection device may receive a third liquid different from the first liquid and the second liquid, the selection operation may select one of the first liquid, the second liquid, and the third liquid which is adhered to the predetermined region, and the third liquid may contain a binder which binds fibers together and a pigment different from that of the second liquid.

The waste paper recycling apparatus according to the aspect described above may further comprise a transport portion which transports the sheet, and the first liquid ejection device may include a plurality of nozzle holes which eject the second liquid, the nozzle holes may be aligned in a direction intersecting a transport direction of the sheet to form lines, and the lines may be aligned in the transport direction.

In the waste paper recycling apparatus according to the aspect described above, the first liquid may contain no pigment.

In the waste paper recycling apparatus according to the aspect described above, the first liquid may contain a pigment different from that contained in the second liquid.

In the waste paper recycling apparatus according to the aspect described above, the first liquid and the second liquid may contain a penetrant.

A waste paper recycling method according to another aspect of the present disclosure comprises: a step of preparing a liquid ejection device which receives a first liquid and a second liquid different from the first liquid, and a step of adhering one of the first liquid and the second liquid to a predetermined region of a sheet containing fibers formed from waste paper. In the waste paper recycling method described above, the first liquid contains a binder which binds fibers together, and the second liquid contains a pigment and a binder which binds fibers together.

A waste paper recycling method according to another aspect of the present disclosure comprises: a step of preparing a first liquid ejection device which receives a first liquid and a second liquid ejection device which receives a second liquid different from the first liquid, and a step of adhering one of the first liquid and the second liquid to a predetermined region of a sheet containing fibers formed from waste paper. In the waste paper recycling method described above, the first liquid contains a binder which binds fibers together, and the second liquid contains a pigment and a binder which binds fibers together.

BRIEF DESCRIPTION OF THE DRAWINGS

FIG. 9 is a table showing an IJ quality and the degree of whiteness of each sheet.

FIG. 10 is a table showing production order of sheets and the number thereof.

DESCRIPTION OF EXEMPLARY EMBODIMENTS

Hereinafter, preferable embodiments of the present disclosure will be described in detail with reference to the attached drawings. In addition, the following embodiments do not unreasonably limit the contents of the present disclosure described in the claims. In addition, all the elements described below are not always required to be essential constituent elements of the present disclosure.

1. First Embodiment 1.1 Waste Paper Recycling Apparatus 1.1.1. Structure

Figure 1:
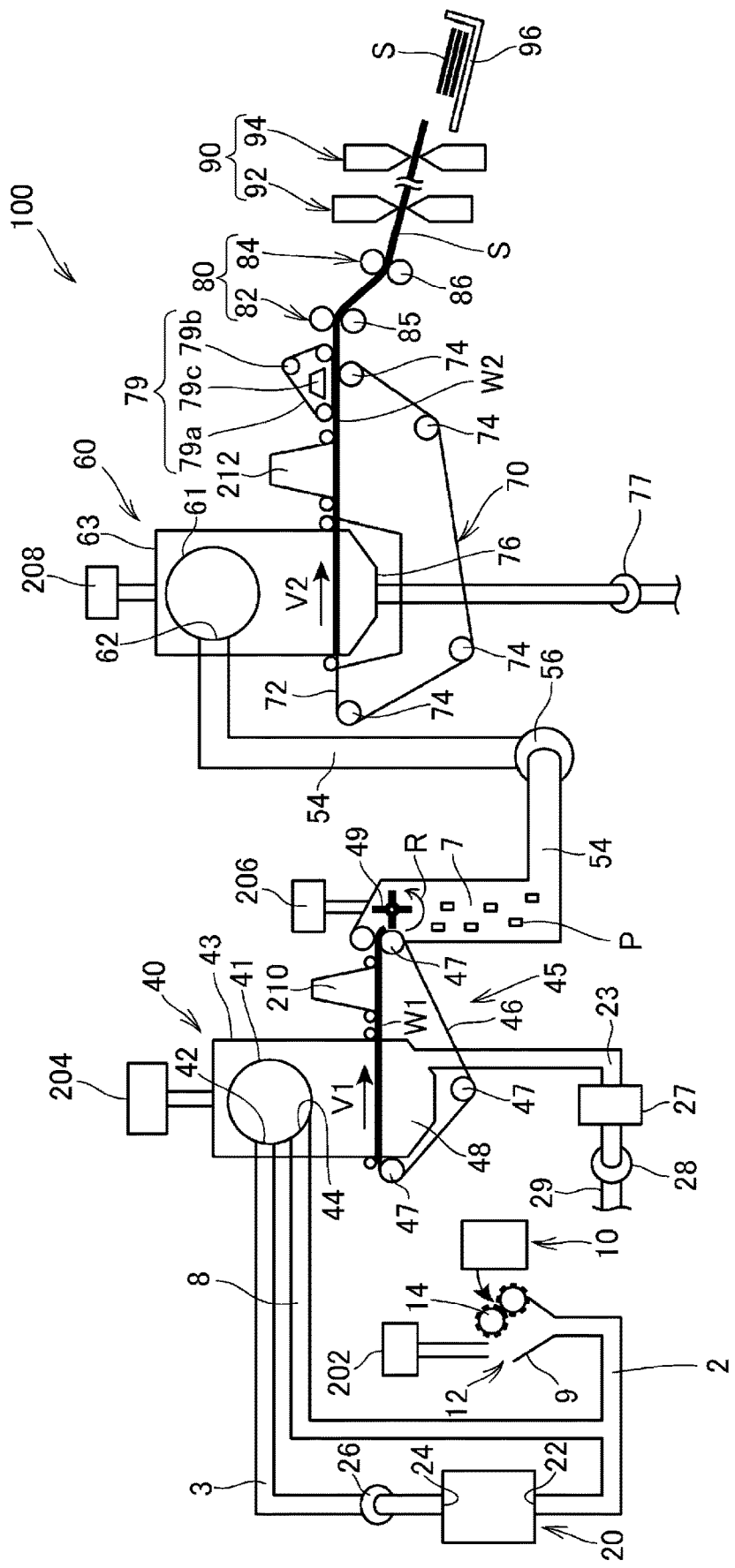
FIG. 1 is a schematic view showing a waste paper recycling apparatus according to a first embodiment.

First, a waste paper recycling apparatus according to a first embodiment will be described with reference to the drawing. FIG. 1 is a schematic view showing a waste paper recycling apparatus 100 according to the first embodiment.

The waste paper recycling apparatus 100 is, for example, a preferable apparatus which manufactures new paper by defibrating used waste paper as a raw material into fibers by a dry method, followed by pressure application, heating, and cutting. By the waste paper recycling apparatus 100, since paper is formed while the density, the thickness, and the shape thereof are controlled, in accordance with the application, such as office paper having an A4 or an A3 size or paper for name cards, paper having various thicknesses and sizes can be manufactured.

The waste paper recycling apparatus 100 includes, for example, a supply portion 10, a coarsely pulverizing portion 12, a defibrating portion 20, a sorting portion 40, a first web forming portion 45, a rotation body 49, a deposition portion 60, a second web forming portion 70, a transport portion 79, a sheet forming portion 80, and a cutting portion 90.

In order to humidify the raw material, a space in which the raw material is transferred, and the like, the waste paper recycling apparatus 100 further includes humidifying portions 202, 204, 206, 208, 210, and 212.

The humidifying portions 202, 204, 206, and 208 are each formed, for example, of a vaporization type or a hot-wind vaporization type humidifier. That is, the humidifying portions 202, 204, 206, and 208 each have a filter (not shown) to be infiltrated with water and each supply humidified air having an increased humidity by allowing air to pass through the filter. The humidifying portions 202, 204, 206, and 208 each may also include a heater (not shown) which effectively increases the humidity of the humidified air.

The humidifying portions 210 and 212 are each formed, for example, of an ultrasonic type humidifier. That is, the humidifying portions 210 and 212 each include a vibration portion (not shown) which atomizes water and each supply mist generated by the vibration portion.

The supply portion 10 supplies the raw material to the coarsely pulverizing portion 12. The raw material to be supplied to the coarsely pulverizing portion 12 may be any material as long as containing fibers, and for example, there may be mentioned paper, pulp, a pulp sheet, a non-woven cloth, a cloth, or a woven fabric. In this embodiment, the structure of the waste paper recycling apparatus 100 in which waste paper is used as the raw material will be described by way of example. The supply portion 10 includes, for example, a stacker in which waste paper is stacked and stored and an automatic charge device feeding the waste paper from the stacker to the coarsely pulverizing portion 12. In addition, a plurality of the waste paper is not always required to be aligned and stacked to each other, and waste paper having various sizes and waste paper having various shapes may be irregularly supplied to the stacker.

The coarsely pulverizing portion 12 cuts the raw material supplied by the supply portion 10 using coarsely pulverizing blades 14 into coarsely pulverized pieces. The coarsely pulverizing blade 14 cuts the raw material in a gas such as the air. The coarsely pulverizing portion 12 includes, for example, a pair of the coarsely pulverizing blades 14 which sandwich and cut the raw material and a drive portion which rotates the coarsely pulverizing blades 14 and can be formed to have a structure similar to that of a so-called shredder. The shape and the size of the coarsely pulverized pieces are arbitrary and may be appropriately determined so as to be suitable to a defibrating treatment in the defibrating portion 20. The coarsely pulverizing portion 12 cuts the raw material into pieces having a size of, for example, one centimeter square to several centimeters square or pieces smaller than that described above.

The coarsely pulverizing portion 12 includes a shoot 9 receiving the coarsely pulverized pieces which fall down after being cut by the coarsely pulverizing blades 14. The shoot 9 has, for example, a tapered shape in which the width thereof is gradually decreased in a direction along which the coarsely pulverized pieces flow down. Hence, the shoot 9 is able to receive many coarsely pulverized pieces. A tube 2 which communicates with the defibrating portion 20 is coupled to the shoot 9 to form a transport path through which the coarsely pulverized pieces are transported to the defibrating portion 20. The coarsely pulverized pieces are collected by the shoot 9 and are transported to the defibrating portion 20 through the tube 2. The coarsely pulverized pieces are transported by an air stream generated by, for example, a blower (not shown) toward the defibrating portion 20 through the tube 2.

To the shoot 9 of the coarsely pulverizing portion 12 or the vicinity of the shoot 9, humidified air is supplied by the humidifying portion 202. Accordingly, the coarsely pulverized pieces cut by the coarsely pulverizing blades 14 are suppressed from being adhered to inner surfaces of the shoot 9 and the tube 2 caused by static electricity. In addition, since the coarsely pulverized pieces cut by the coarsely pulverizing blades 14 are transported to the defibrating portion 20 together with humidified air having a high humidity, an effect of suppressing the adhesion of a defibrated material in the defibrating portion 20 can also be anticipated. In addition, the humidifying portion 202 may also be configured so as to supply humidified air to the coarsely pulverizing blades 14 and to remove electricity of the raw material supplied by the supply portion 10. In addition, besides the humidifying portion 202, removal of electricity may also be performed using an ionizer.

The defibrating portion 20 defibrates the coarsely pulverized pieces cut in the coarsely pulverizing portion 12. In more particular, in the defibrating portion 20, the raw material cut by the coarsely pulverizing portion 12 is processed by the defibrating treatment to produce a defibrated material. In this case, the "defibrate" indicates that the raw material formed of fibers bound to each other is disentangled into separately independent fibers. The defibrating portion 20 also has a function to separate substances, such as resin particles, an ink, a toner, and a blurring inhibitor, each of which is adhered to the raw material, from the fibers.

A material passing through the defibrating portion 20 is called a "defibrated material". In the "defibrated material", besides the fibers thus disentangled, resin particles, that is, resin particles functioning to bind fibers together; coloring materials, such as an ink and a toner; and additives, such as a blurring inhibitor and a paper strength improver, which are separated from the fibers when the fibers are disentangled, may also be contained in some cases. The defibrated material thus disentangled has a string shape or a ribbon shape. The defibrated material thus disentangled may be present in a state, that is, in an independent state, so as not to be entangled with other disentangled fibers or may be present in a state, that is, in a state in which so-called "damas" are formed, so as to be entangled together to form lumps.

The defibrating portion 20 performs dry defibration. In this case, a treatment, such as defibration, which is performed not in a liquid but in a gas, such as the air, is called a dry type. The defibrating portion 20 is formed, for example, to use an impellor mill. In particular, although not shown in the drawing, the defibrating portion 20 includes a high-speed rotating rotor and a liner disposed around the outer circumference of the rotor. The coarsely pulverized pieces cut by the coarsely pulverizing portion 12 are sandwiched between the rotor and the liner of the defibrating portion 20 and are then defibrated thereby. The defibrating portion 20 generates an air stream by the rotation of the rotor. By this air stream, the defibrating portion 20 sucks the coarsely pulverized pieces functioning as the raw material through the tube 2, and the defibrated material can be transported to a discharge port 24. The defibrated material is fed to a tube 3 from the discharge port 24 and then transported to the sorting portion 40 through the tube 3.

As described above, the defibrated material produced in the defibrating portion 20 is transported to the sorting portion 40 from the defibrating portion 20 by the air stream generated thereby. Furthermore, in the example shown in the drawing, the waste paper recycling apparatus 100 includes a defibrating blower 26 functioning as an air stream generator, and by an air stream generated by the defibrating blower 26, the defibrated material is transported to the sorting portion 40. The defibrating blower 26 is provided for the tube 3, and air is sucked together with the defibrated material from the defibrating portion 20 and then sent to the sorting portion 40.

The sorting portion 40 includes an inlet port 42 into which the defibrated material defibrated in the defibrating portion 20 flows together with the air stream through the tube 3. The sorting portion 40 sorts the defibrated material introduced into the inlet port 42 by the length of the fibers. In particular, the sorting portion 40 sorts the defibrated material defibrated in the defibrating portion 20 into a defibrated material having a predetermined size or less as a first sorted material and a defibrated material larger than the first sorted material as a second sorted material. The first sorted material includes fibers, particles, and the like, and the second sorted material includes, for example, large fibers, non-defibrated pieces, coarsely pulverizing pieces which are not sufficiently defibrated, and damas which are formed since defibrated fibers are aggregated or entangled with each other.

The sorting portion 40 includes, for example, a drum portion 41 and a housing portion 43 receiving the drum portion 41.

The drum portion 41 is a cylindrical sieve which is rotatably driven by a motor. The drum portion 41 has a net and functions as a sieve. By the meshes of this net, the drum 41 sorts the first sorted material smaller than the sieve opening of the net and the second sorted material larger than the sieve opening of the net. As the net of the drum portion 41, for example, there may be used a metal net, an expanded metal formed by expanding a metal plate provided with cut lines, or a punched metal in which holes are formed in a metal plate by a press machine or the like.

The defibrated material introduced into the inlet port 42 is fed together with the air stream to the inside of the drum portion 41, and by the rotation of the drum portion 41, the first sorted material is allowed to fall down through the meshes of the net of the drum portion 41. The second sorted material which is not allowed to pass through the meshes of the net of the drum portion 41 is guided to a discharge port 44 by the air stream flowing into the drum portion 41 from the inlet port 42 and is then fed to a tube 8.

The tube 8 communicates between the inside of the drum portion 41 and the tube 2. The second sorted material which flows through the tube 8 flows together with the coarsely pulverized pieces cut by the coarsely pulverizing portion 12 in the tube 2 and is then guided to an inlet port 22 of the defibrating portion 20. Accordingly, the second sorted material is returned to the defibrating portion 20 and is then subjected to the defibrating treatment.

In addition, the first sorted material sorted by the drum portion 41 is dispersed in air through the meshes of the net of the drum portion 41 and is then allowed to fall down to a mesh belt 46 of the first web forming portion 45 located under the drum portion 41.

The first web forming portion 45 includes the mesh belt 46, rollers 47, and a suction portion 48. The mesh belt 46 is an endless belt, is suspended by the three rollers 47, and by the movement of the rollers 47, is transported in a direction shown by an arrow in the drawing. The surface of the mesh belt 46 is formed of a net in which openings having a predetermined size are arranged. Of the first sorted material which is allowed to fall down from the sorting portion 40, fine particles passing through the meshes of the net fall down to a lower side of the mesh belt 46, and fibers having a size which are not allowed to pass through the meshes of the net are deposited on the mesh belt 46 and are transported therewith in the arrow direction. The fine particles which fall down through the mesh belt 46 include particles having a relatively small size and/or a low density of the defibrated material, that is, include resin particles which are not necessary for binding between the fibers, coloring materials, additives, and the like, and the fine particles are unnecessary materials which will not be used for manufacturing of a sheet S by the waste paper recycling apparatus 100.

The mesh belt 46 is transferred at a predetermined velocity V1 during a normal operation for manufacturing of the sheet S. In the case described above, "during the normal operation" indicates during the operation other than that performing a start control and a stop control of the waste paper recycling apparatus 100 and, in more particular, indicates during manufacturing of a sheet S having a preferable quality by the waste paper recycling apparatus 100.

Accordingly, the defibrated material processed by the defibrating treatment in the defibrating portion 20 is sorted into the first sorted material and the second sorted material in the sorting portion 40, and the second sorted material is returned to the defibrating portion 20. In addition, from the first sorted material, the unnecessary materials are removed by the first web forming portion 45. The residues obtained after the unnecessary materials are removed from the first sorted material are a material suitable for manufacturing of the sheet S, and this material is deposited on the mesh belt 46 to form a first web W1.

The suction portion 48 sucks air under the mesh belt 46. The suction portion 48 is coupled to a dust collection portion 27 through a tube 23. The dust collection portion 27 is a filter-type or a cyclone-type dust collection device and separates fine particles from the air stream. A collection blower 28 is provided at a downstream side of the dust collection portion 27 and functions as a dust suction portion which sucks air from the dust collection portion 27. In addition, air discharged from the collection blower 28 is discharged outside of the waste paper recycling apparatus 100 through a tube 29.

According to the waste paper recycling apparatus 100, by the collection blower 28, air is sucked from the suction portion 48 through the dust collection portion 27. In the suction portion 48, fine particles passing through the meshes of the net of the mesh belt 46 are sucked together with air and are then fed to the dust collection portion 27 through the tube 23. In the dust collection portion 27, the fine particles passing through the mesh belt 46 are separated from the air stream and are then accumulated.

Hence, fibers obtained after the unnecessary materials are removed from the first sorted material are deposited on the mesh belt 46, and hence, the first web W1 is formed. Since the suction is performed by the collection blower 28, the formation of the first web W1 on the mesh belt 46 is promoted, and in addition, the unnecessary materials can be rapidly removed.

To a space including the drum portion 41, humidified air is supplied by the humidifying portion 204. By this humidified air, the first sorted material is humidified in the sorting portion 40. Accordingly, the adhesion of the first sorted material to the mesh belt 46 caused by static electricity is suppressed, so that the first sorted material is likely to be peeled away from the mesh belt 46. Furthermore, the adhesion of the first sorted material to the rotation body 49 and the inner wall of the housing portion 43 caused by static electricity can be suppressed. In addition, by the suction portion 48, the unnecessary materials can be efficiently sucked.

In addition, in the waste paper recycling apparatus 100, the structure in which the first sorted material and the second sorted material are sorted and separated is not limited to the sorting portion 40 including the drum portion 41. For example, the structure in which the defibrated material obtained by the defibrating treatment in the defibrating portion 20 is classified by a classifier may also be used. As the classifier, for example, a cyclone classifier, an elbow-jet classifier, or an eddy classifier may be used. When those classifiers are used, the first sorted material and the second sorted material can be sorted and separated. Furthermore, by the classifiers described above, the structure in which materials having a relatively small size and/or a low density, that is, the unnecessary materials, such as resin particles, coloring materials, and additives, which are not necessary for binding between the fibers, in the defibrated material are separated and removed therefrom can be realized. For example, the structure in which fine particles contained in the first sorted material are removed therefrom by a classifier may also be formed. In this case, the structure in which the second sorted material is returned, for example, to the defibrating portion 20, the unnecessary materials are collected by the dust collection portion 27, and the first sorted material other than the unnecessary materials is fed to a tube 54 may be formed.

In a transport path of the mesh belt 46, at a downstream side of the sorting portion 40, air containing mist is supplied by the humidifying portion 210. The mist which is fine particles of water generated by the humidifying portion 210 falls down to the first web W1 and supplies moisture thereto. Accordingly, the moisture amount contained in the first web W1 is adjusted, and hence, for example, the adsorption of the fibers to the mesh belt 46 caused by static electricity can be suppressed.

The waste paper recycling apparatus 100 includes the rotation body 49 which divides the first web W1 deposited on the mesh belt 46. The first web W1 is peeled away from the mesh belt 46 at a position at which the mesh belt 46 is folded by the roller 47 and is then divided by the rotation body 49.

The first web W1 is a soft material having a web shape formed by deposition of the fibers, and the rotation body 49 disentangles the fibers of the first web W1.

Although the structure of the rotation body 49 is arbitrarily formed, in the example shown in the drawing, the rotation body 49 has a rotating blade shape having rotatable plate-shaped blades. The rotation body 49 is disposed at a position at which the first web W1 peeled away from the mesh belt 46 is brought into contact with the blade. By the rotation of the rotation body 49, such as the rotation in a direction indicated by an arrow R in the drawing, the first web W1 peeled away from and transported by the mesh belt 46 collides with the blade and is divided thereby, so that small parts P are produced.

In addition, the rotation body 49 is preferably placed at a position at which the blade of the rotation body 49 does not collide with the mesh belt 46. For example, the distance between a front end of the blade of the rotation body 49 and the mesh belt 46 can be set to be 0.05 to 0.5 mm, and in this case, without causing damage on the mesh belt 46, the first web W1 can be efficiently divided by the rotation body 49.

The small parts P divided by the rotation body 49 fall down in a tube 7 and are then transported to the tube 54 by an air stream flowing inside the tube 7.

In addition, to a space including the rotation body 49, humidified air is supplied by the humidifying portion 206. Accordingly, a phenomenon in which the fibers are adsorbed by static electricity to the inside of the tube 7 and the blades of the rotation body 49 can be suppressed.

By the air stream generated by the blower 56, the small parts P falling down in the tube 7 are sucked in the tube 54 and are allowed to pass through the inside of the blower 56. By the air stream generated by the blower 56 and the function of a rotating portion, such as a blade, of the blower 56, the small parts P are transported to the deposition portion 60 through the tube 54.

The deposition portion 60 deposits the defibrated material defibrated in the defibrating portion 20. In more particular, the deposition portion 60 introduces the small parts P through an inlet port 62 and disentangles the defibrated material thus entangled, so that the defibrated material is allowed to fall down while being dispersed in air. Accordingly, the deposition portion 60 can uniformly deposit the defibrated material in the second web forming portion 70.

The deposition portion 60 includes a drum portion 61 and a housing portion 63 receiving the drum portion 61. The drum portion 61 is a cylindrical sieve rotatably driven by a motor. The drum portion 61 has a net and functions as a sieve. By the meshes of this net, the drum portion 61 allows fibers and particles, each of which is smaller than the mesh opening of this net, to pass through and fall down from the drum portion 61. For example, the structure of the drum portion 61 is the same as that of the drum portion 41.

In addition, the "sieve" of the drum portion 61 may not have a function to sort a specific object. That is, the "sieve" to be used as the drum portion 61 indicates a member provided with a net, and the drum portion 61 may allow all of the defibrated material introduced thereinto to fall down.

Under the drum portion 61, the second web forming portion 70 is disposed. The second web forming portion 70 deposits a material passing through the deposition portion 60 to form a second web W2. The second web forming portion 70 includes, for example, a mesh belt 72, rollers 74, and a suction mechanism 76.

The mesh belt 72 is an endless belt, is suspended by the rollers 74, and by the movement of the rollers 74, is transported in a direction shown by an arrow in the drawing. The mesh belt 72 is formed, for example, of a metal, a resin, a cloth, or a non-woven cloth. The surface of the mesh belt 72 is formed of a net in which openings having a predetermined size are arranged. Of the fibers which are allowed to fall down from the drum portion 61, fibers having a size which are allowed to pass through the meshes of the net fall down to a lower side of the mesh belt 72, and fibers having a size which are not allowed to fall down through the meshes of the net are deposited on the mesh belt 72 and are transported therewith in the arrow direction. The mesh belt 72 is transferred at a predetermined velocity V2 during a normal operation for manufacturing of the sheet S. The "during the normal operation" indicates the same as described above.

The meshes of the net of the mesh belt 72 are fine and may be set so that most of the fibers falling down from the drum portion 61 are not allowed to pass therethrough.

The suction mechanism 76 is provided at a lower side of the mesh belt 72. The suction mechanism 76 includes a suction blower 77, and by a suction force of the suction blower 77, an air stream toward a lower side can be generated in the suction mechanism 76.

By the suction mechanism 76, a defibrated material dispersed in air by the deposition portion 60 is sucked on the mesh belt 72. Accordingly, the formation of the second web W2 on the mesh belt 72 is promoted, and hence, a discharge rate from the deposition portion 60 can be increased. Furthermore, by the suction mechanism 76, a downflow can be formed in a falling path of the defibrated material, and hence, the defibrated material can be prevented from being entangled with each other during the falling.

The suction blower 77 may discharge air sucked from the suction mechanism 76 outside of the waste paper recycling apparatus 100 through a collection filter (not shown). Alternatively, air sucked by the suction blower 77 may be fed to the dust collection portion 27 so that unnecessary materials contained in the air sucked by the suction mechanism 76 may be collected.

To a space including the drum portion 61, humidified air is supplied by the humidifying portion 208. By this humidified air, the inside of the deposition portion 60 can be humidified, and the adhesion of fibers to the housing portion 63 caused by static electricity is suppressed, so that the fibers are allowed to rapidly fall down on the mesh belt 72, and the second web W2 can be formed to have a preferable shape.

As described above, through the deposition portion 60 and the second web forming portion 70, the second web W2 can be formed so as to be softly expanded with a large amount of air incorporated therein. The second web W2 deposited on the mesh belt 72 is transported to the sheet forming portion 80.

In a transport path of the mesh belt 72, at a downstream side of the deposition portion 60, by the humidifying portion 212, air containing mist is supplied. Accordingly, the mist generated by the humidifying portion 212 is supplied to the second web W2, so that the content of moisture contained in the second web W2 is adjusted. Accordingly, for example, the adsorption of fibers to the mesh belt 72 caused by static electricity can be suppressed.

The waste paper recycling apparatus 100 includes the transport portion 79 which transports the second web W2 on the mesh belt 72 to the sheet forming portion 80. The transport portion 79 includes, for example, a mesh belt 79a, rollers 79b, and a suction mechanism 79c.

The suction mechanism 79c includes a blower not shown, and by a suction force of the blower, an upward air stream is generated to the mesh belt 79a. This air stream sucks the second web W2, and the second web W2 is separated from the mesh belt 72 and then adsorbed to the mesh belt 79a. The mesh belt 79a is transferred by the rotations of the rollers 79b, so that the second web W2 is transported to the sheet forming portion 80. The transfer rate of the mesh belt 72 is the same, for example, as the transfer rate of the mesh belt 79a.

As described above, the transport portion 79 peels away the second web W2 formed on the mesh belt 72 therefrom and then transports the second web W2 thus peeled away.

The sheet forming portion 80 forms the sheet S from a deposit deposited in the deposition portion 60. In more particular, the sheet forming portion 80 forms the sheet S by heating and pressurizing the second web W2 which is deposited on the mesh belt 72 and is then transported by the transport portion 79.

The sheet forming portion 80 includes a pressure application portion 82 which pressurizes the second web W2 and a heating portion 84 which heats the second web W2 pressurized by the pressure application portion 82.

The pressure application portion 82 is formed of a pair of calendar rollers 85 which sandwich the second web W2 at a predetermined nip pressure for pressure application. Since the second web W2 is pressurized, the thickness thereof is decreased, and hence, the density of the second web W2 is increased. One of the pair of calendar rollers 85 is a drive roller driven by a motor not shown in the drawing, and the other roller is a driven roller. The calendar rollers 85 are rotated by a driving force of the motor, and the second web W2, the density of which is increased by the pressure application, is transported toward the heating portion 84.

The heating portion 84 is formed, for example, using heating rollers, a heat press forming machine, a hot plate, a hot-wind blower, an infrared heater, or a flash fixing device. In the example shown in the drawing, the heating portion 84 includes a pair of heating rollers 86. The heating rollers 86 are heated to a predetermined temperature by a heater disposed inside or outside. The heating rollers 86 sandwich the second web W2 pressurized by the calendar rollers 85 for heating, so that the sheet S is formed.

One of the pair of heating rollers 86 is a drive roller driven by a motor not shown in the drawing, and the other roller is a driven roller. The heating rollers 86 are rotated by a driving force of the motor, so that the sheet S thus heated is transported toward the cutting portion 90.

As described above, the second web W2 formed in the deposition portion 60 is pressurized and heated in the sheet forming portion 80, so that the sheet S is formed.

In addition, the number of the calendar rollers 85 of the pressure application portion 82 and the number of the heating rollers 86 of the heating portion 84 are not particularly limited.

The cutting portion 90 cuts the sheet S formed in the sheet forming portion 80. In the example shown in the drawing, the cutting portion 90 includes a first cutting portion 92 which cuts the sheet S in a direction intersecting a transport direction of the sheet S and a second cutting portion 94 which cuts the sheet S in a direction parallel to the transport direction. The second cutting portion 94 cuts, for example, the sheet S which passes through the first cutting portion 92.

As described above, a single sheet S having a predetermined size is formed. The single sheet S thus cut is discharged to a discharge portion 96. The discharge portion 96 includes a tray or a stacker on each of which sheets S each having a predetermined size are placed.

In addition, although not shown in the drawing, the humidifying portions 202, 204, 206, and 208 may be formed from one vaporization type humidifier. In this case, the structure may be formed so that humidified air generated by one humidifier is branched and supplied to the coarsely pulverizing portion 12, the housing portion 43, the tube 7, and the housing portion 63. When a duct which supplies humidified air is branched and then installed, the structure described above can be easily realized. In addition, the humidifying portions 202, 204, 206, and 208 may also be formed from two or three vaporization type humidifiers.

In addition, the humidifying portions 210 and 212 may be formed from one ultrasonic type humidifier or may be formed from two ultrasonic type humidifiers. For example, air containing mist generated by one humidifier may be configured to be branched and supplied to the humidifying portions 210 and 212.

1.1.2. Ink Jet Head (Liquid Ejection Device)

Figure 2:
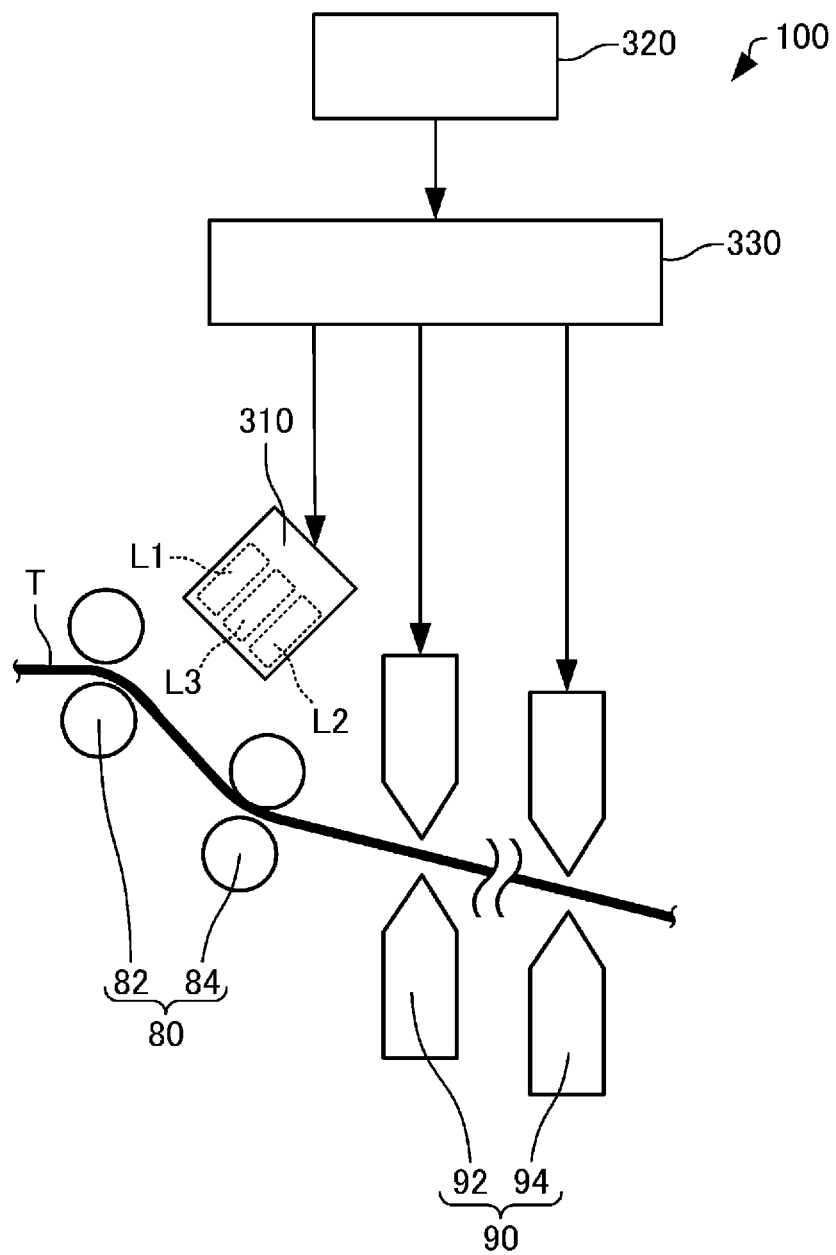
FIG. 2 is a schematic view showing a part of the waste paper recycling apparatus according to the first embodiment.

Next, an ink jet head and the like of the waste paper recycling apparatus 100 will be described. FIG. 2 is a schematic view showing a part of the waste paper recycling apparatus 100. In addition, the ink jet head is not limited to a head which ejects an ink, any ink jet head may be used as long as the following first liquid L1, second liquid L2, third liquid L3, and the like can be ejected, and a material to be ejected is not required to be a color or a colorless material.

As shown in FIG. 2, the waste paper recycling apparatus 100 includes an ink jet head 310, a receiving portion 320, and a control portion 330. In addition, for the convenience of illustration, in FIG. 1, the ink jet head 310, the receiving portion 320, and the control portion 330 are omitted.

In the ink jet head 310, as shown in FIG. 2, the first liquid L1 and the second liquid L2 different from the first liquid L1 are received. In the example shown in the drawing, the ink jet head 310 further receives a third liquid L3 different from the first liquid L1 and the second liquid L2. The first liquid L1, the second liquid L2, and the third liquid L3 are liquids having compositions different from each other. The ink jet head 310 ejects, for example, the first liquid L1, the second liquid L2, and the third liquid L3 to a sheet T.

The first liquid L1, the second liquid L2, and the third liquid L3 each contain a binder which binds fibers together. As the binder contained in each of the liquids L1, L2, and L3, for example, a thermoplastic resin, a thermosetting resin, or a water-soluble resin may be mentioned. In particular, as the binder, for example, there may be mentioned a styrene-butadiene copolymer, an acrylonitrile-butadiene copolymer, an acrylic acid-ester copolymer, a styrene-acrylic acid copolymer, a polyurethane, a polyester, a poly(vinyl acetate), an ethylene-vinyl acetate copolymer, a polyacrylamide, a poly (vinyl alcohol), a poly(vinyl pyrrolidone), a cellulose derivative, such as a carboxymethyl cellulose, a hydroxymethyl cellulose, or an agar, a starch such as dextrin, a gelatin, a glue, or a casein. Those binders may be contained alone, or at least two types thereof may be contained in combination.

The liquids L1, L2, and L3 may contain the same type of binder or different types of binders from each other. Hereinafter, the case in which the binders contained in the liquids L1, L2, and L3 are each a thermoplastic resin will be described.

The content of the binder in each of the liquids L1, L2, and L3 is, for example, 0.1 to 30.0 percent by mass and preferably 0.1 to 20 percent by mass. When the content thereof is 0.1 to 30.0 percent by mass, the viscosity of each of the liquids L1, L2, and L3 can be decreased so that the liquids L1, L2, and L3 each can be sufficiently ejected from the ink jet head 310.

The viscosity of each of the liquids L1, L2, and L3 is preferably 8.0 mPa·s or less. When the viscosity of each of the liquids L1, L2, and L3 is more than 8.0 mPa·s, the viscosity is excessively high, and hence, it may become difficult to eject the liquid from the ink jet head 310 in some cases.

The glass transition temperature of each of the thermoplastic resin and the thermosetting resin contained as the binder in each of the liquids L1, L2, and L3 is, for example, −50° C. to 130° C. When the glass transition temperature of the binder is in the range described above, binding between the fibers can be improved, and a paper strength can be increased.

The liquids L1, L2, and L3 each may contain a penetrant. Accordingly, the infiltration of each of the liquids L1, L2, and L3 in the thickness direction of the sheet T can be improved. As the penetrant contained in each of the liquids L1, L2, and L3, for example, there may be mentioned a glycol ether, such as triethylene glycol monobutyl ether, triethylene glycol dimethyl ether, triethylene glycol diethyl ether, triethylene glycol dibutyl ether, or triethylene glycol methyl butyl ether; a silicone-based surfactant, an acetylene glycol-based surfactant, an acetylene alcohol-based surfactant, or a fluorine-based surfactant. The penetrants mentioned above may be contained alone, or at least two types thereof may be contained in combination. The liquids L1, L2, and L3 may contain the same type of penetrant or different types of penetrants from each other. Furthermore, the content of the penetrant in each of the liquids L1, L2, and L3 is preferably 1 to 30 percent by mass and more preferably 3 to 20 percent by mass. When the content is in the range described above, the liquids L1, L2, and L3 are promoted to be infiltrated deeply in the sheet T, and the paper strength can be increased.

The liquids L1, L2, and L3 may contain a moisturizer. Accordingly, when the liquids L1, L2, and L3 are ejected by the ink jet head 310, clogging of a nozzle hole thereof is not likely to occur. As the moisturizer contained in the liquids L1, L2, and L3, for example, there may be mentioned diethylene glycol, triethylene glycol, propylene glycol, dipropylene glycol, 1,3-propanediol, 1,3-butylene glycol, 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-propanediol, 1,2-hexanediol, 2-ethyl-1,3-hexanediol, 3-methyl-1,5-penetandiol, 2-methylpenetane-2,4-diol, trimethylolpropane, or glycerin. The liquids L1, L2, and L3 may contain the same type of moisturizer or different types of moisturizers from each other.

The liquids L1, L2, and L3 each may contain water. As the water, purified water or ultra purified water, such as ion-exchanged water, ultrafiltrated water, reverse osmosis water, or distilled water, is preferably used. In addition, water sterilized by UV irradiation or addition of hydrogen peroxide is preferable since the generation of fungi and/or bacterial can be prevented, and long storage can be performed.

As other additives to be contained in the liquids L1, L2, and L3, for example, there may be mentioned an UV absorber, a light stabilizer, a quencher, an antioxidant, a water resistant agent, a fungicide, an antiseptic agent, a thickening agent, a flow modifier, a pH adjuster, a defoaming agent, an antifoam agent, a leveling agent, and/or a antistatic agent.

The first liquid L1 contains no pigment. The second liquid L2 and the third liquid L3 contain different types of pigments from each other. The pigments contained in the liquids L2 and L3 each may be either a white pigment or a non-white pigment.

As the white pigment, for example, there may be mentioned silica, titanium dioxide, zinc oxide, kaolin, clay, white clay, calcium carbonate, calcium sulfate, silica gel, alumina, plastic, barium sulfate, or magnesium oxide. Titanium dioxide has a particle diameter larger than that of silica and has a high degree of whiteness. On the other hand, silica has a particle diameter smaller than that of titanium dioxide and has a good image quality when printing is performed by an ink jet printer.

As a black pigment, for example, there may be mentioned carbon black, such as No. 2300, No. 900, MCF88, No. 33, No. 40, No. 45, No. 52, MA7, MA8, MA100, or No. 2200B, each of which is manufactured by Mitsubishi Chemical Corporation.

As a yellow pigment, for example, there may be mentioned C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, or 180.

As a magenta pigment, for example, there may be mentioned C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, or 245, or C.I. Pigment Violet 19, 23, 32, 33, 36, 38, 43, or 50.

As a cyan pigment, for example, there may be mentioned C.I. Pigment Blue 1, 2, 3, 15, 15:1, 15:2, 15:3, 15:34, 15:4, 16, 18, 22, 25, 60, 65, or 66, or C.I. Pigment Vat Blue 4 or 60.

As a non-white pigment other than black, yellow, magenta, and cyan, for example, there may be mentioned C.I. Pigment Green 7 or 10, C.I. Pigment Brown 3, 5, 25, or 26, or C.I. Pigment Orange 1, 2, 5, 7, 13, 14, 15, 16, 24, 34, 36, 38, 40, 43, or 63.

Figure 3:
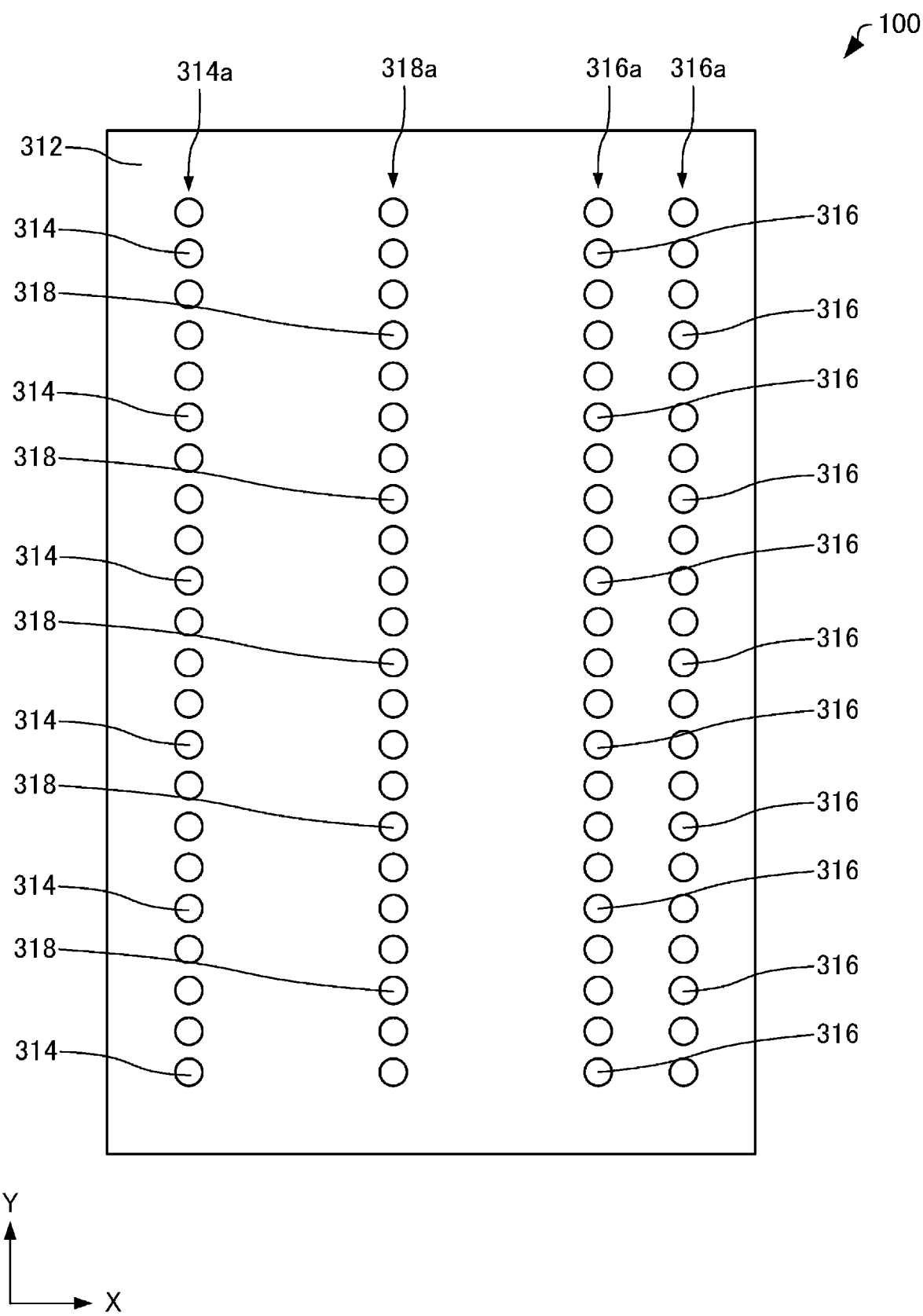
FIG. 3 is a schematic plan view showing a nozzle plate of the waste paper recycling apparatus according to the first embodiment.

Next, FIG. 3 is a schematic plan view showing a nozzle plate 312 of the ink jet head 310. In addition, in FIG. 3, as two axes orthogonal to each other, an X axis and a Y axis are shown.

A material of the nozzle plate 312, for example, Steel Use Stainless (SUS) is used. In the nozzle plate 312, first nozzle holes 314, second nozzle holes 316, and third nozzle holes 318 are provided. The first nozzle hole 314 is a nozzle hole through which the first liquid L1 is ejected. The second nozzle hole 316 is a nozzle hole through which the second liquid L2 is ejected. The third nozzle hole 318 is a nozzle hole through which the third liquid L3 is ejected. In the example shown the drawing, the plan shapes of the nozzle holes 314, 316, and 318 are each a circle.

As described above, the first nozzle holes 314, the second nozzle holes 316, and the third nozzle holes 318 are provided. The first nozzle holes 314 are aligned in a Y axis direction to form a first line 314a. The second nozzle holes 316 are aligned in the Y axis direction to form second lines 316a. The second lines 316a are aligned in an X axis direction. The third nozzle holes 318 are aligned in the Y axis direction to form a third line 318a. In addition, although not shown in the drawing, at least two first lines 314a may be aligned in the X axis direction, and/or at least two third lines 318a may be aligned in the X axis direction. The X axis direction is a transport direction of the sheet T. The Y axis direction is a direction intersecting the transport direction of the sheet T and is, in particular, a direction orthogonal to the transport direction of the sheet T.

The lengths of the first line 314a, the second line 316a, and the third line 318a are each longer than the length of the sheet T in the Y axis direction. The ink jet head 310 is a line head system. Accordingly, the productivity can be improved.

The waste paper recycling apparatus 100 includes the pressure application portion 82 which pressurizes the sheet T, and the ink jet head 310 may adhere one of the first liquid L1, the second liquid L2, and the third liquid L3 to the pressurized sheet T. The density of the pressurized sheet T is preferably 0.09 g/cm$^3$ or more. Hence, compared to the case in which one of the first liquid L1, the second liquid L2, and the third liquid L3 is adhered to the sheet T in the state of web which is not yet pressurized, by the waste paper recycling apparatus 100, the first liquid L1, the second liquid L2, and the third liquid L3 are likely to be infiltrated in the sheet T. Since the infiltration of the first liquid L1, the second liquid L2, and the third liquid L3 is performed by a capillary phenomenon, compared to the web containing a large amount of air, in the state in which the amount of air is small due to pressure application, the liquids L1, L2, and L3 are likely to be infiltrated.

As shown in FIG. 2, the receiving portion 320 is a device receiving an input of a user and outputs input information to the control portion 330. The function of the receiving portion 320 can be realized by an input device, such as a keyboard, a mouse, a bottom, or a touch panel. The receiving portion 320 receives a selection operation which selects one of the first liquid L1, the second liquid L2, and the third liquid L3 which is adhered to a predetermined region of a sheet T containing fiber formed from waste paper. Furthermore, the receiving portion 320 may also receive an input instructing the shape, the size, and the position of the predetermined region of the sheet T, and the amounts of the liquids L1, L2, and L3 to be ejected.

Figure 4:
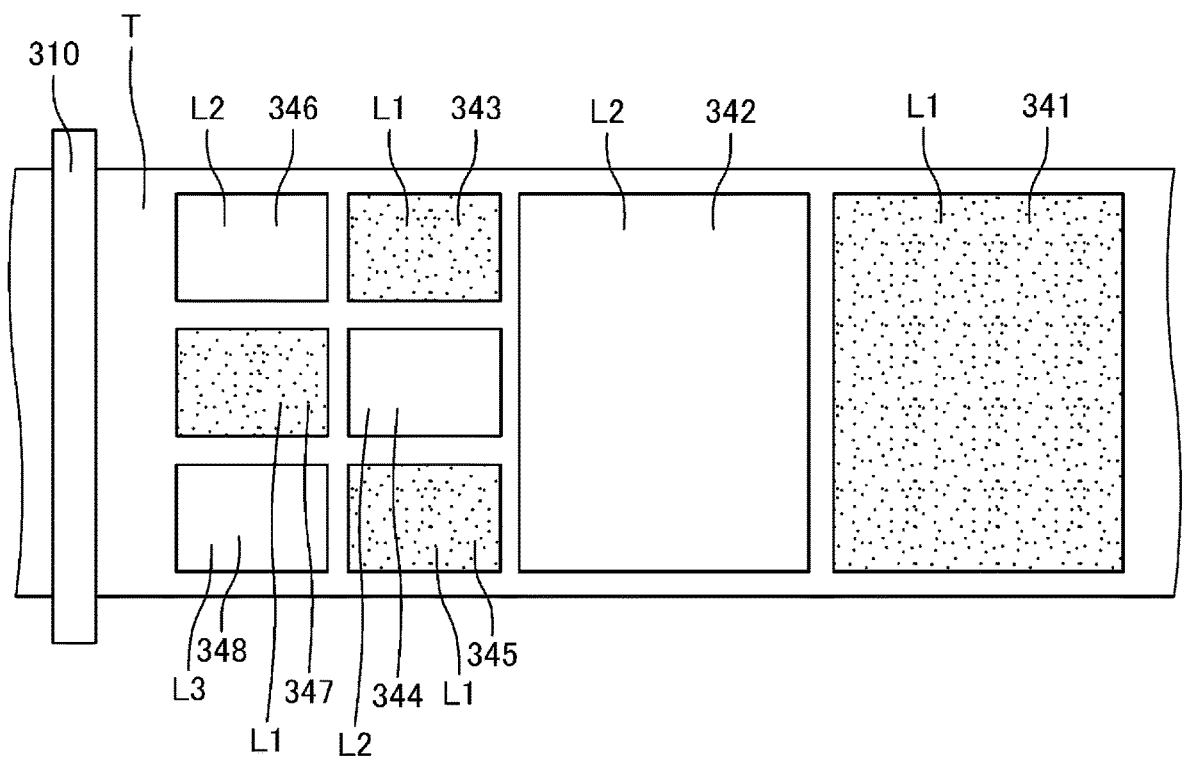
FIG. 4 is a view illustrating a sheet to which a first liquid, a second liquid, and a third liquid are adhered.

Next, FIG. 4 is a view illustrating the sheet T to which the first liquid L1, the second liquid L2, and the third liquid L3 are adhered.

For example, as shown in FIG. 4, the receiving portion 320 receives a selection operation in which the first liquid L1 is adhered to a first region 341, the second liquid L2 is adhered to a second region 342, the first liquid L1 is adhered to a third region 343, the second liquid L2 is adhered to a fourth region 344, the first liquid L1 is adhered to a fifth region 345, the second liquid L2 is adhered to a sixth region 346, the first liquid L1 is adhered to a seventh region 347, and the third liquid L3 is adhered to an eighth region 348.

In the example shown in the drawing, the regions 341 and 342 are each a region having an A3 size. The regions 343, 344, 345, 346, 347, and 348 are each a region having a name card size. The shape, the size, and the position of each of the regions 341 to 348 are determined by the information received by the receiving portion 320 and are not limited to those of the example shown in the drawing.

As shown in FIG. 2, the control portion 330 controls the ink jet head 310 so that the liquid selected by the selection operation received by the receiving portion 320 is adhered to the predetermined region of the sheet T. The function of the control portion 330 can be realized by a hardware, such as various types of processors (a CPU, a DSP, and the like) and ASICs (such as a gate array), or a program.

As shown in FIG. 4, the control portion 330 controls the ink jet head 310 so that the first liquid L1 is adhered to the first region 341, the second liquid L2 is adhered to the second region 342, the first liquid L1 is adhered to the third region 343, the second liquid L2 is adhered to the fourth region 344, the first liquid L1 is adhered to the fifth region 345, the second liquid L2 is adhered to the sixth region 346, the first liquid L1 is adhered to the seventh region 347, and the third liquid L3 is adhered to the eighth region 348.

As shown in FIG. 2, for example, the ink jet head 310 adheres the liquid to the sheet T pressurized by the pressure application portion 82. Hence, compared to the case in which the liquid is adhered to the sheet T in the state of web which is not yet pressurized, the liquid is likely to be infiltrated in the sheet T. Since the infiltration of the liquid in the sheet T is caused by the capillary phenomenon, compared to the web containing a large amount of air, in the state in which the amount of air is small due to the pressure application, the liquid is likely to be infiltrated.

The heating portion 84 heats the sheet T to which the liquid from the ink jet head 310 is adhered. Accordingly, the fibers contained in the sheet T are bound together by the binder contained in the liquid. In the example shown in the drawing, the pressure application portion 82 and the heating portion 84 are each formed of rollers and each function as a transport portion which transports the sheet T. In addition, although not shown in the drawing, besides the heating portion 84, by hot wind, infrared rays, electromagnetic waves, heating rollers, a heat press, or the like, the sheet T to which the liquid is adhered may be separately heated. Accordingly, melt binding and/or gluing of the binder contained in the liquid can be promoted, and drying of water and the like can also be promoted.

The cutting portion 90 cuts the predetermined region out of the sheet T. The control portion 330 controls the cutting portion 90 so as to cut the predetermined region out of the sheet T. As shown in FIG. 4, the cutting portion 90 cuts out the regions 341 to 348.

The regions 341, 343, 345, and 347 to which the first liquid L1 is adhered are cut out by the cutting portion 90, so that regular sheets are formed. The regions 342, 344, and 346 to which the second liquid L2 is adhered are cut out by the cutting portion 90, so that ink jet (IJ) exclusive sheets are formed. The eighth region 348 to which the third liquid L3 is adhered is cut out by the cutting portion 90, so that, for example, an IJ exclusive sheet having a degree of whiteness different from that of the IJ exclusive sheet to which the second liquid L2 is adhered is formed.

The waste paper recycling apparatus 100 has, for example, the following features.

The waste paper recycling apparatus 100 includes the ink jet head 310 which receives the liquids L1 and L2, the receiving portion 320 which receives the selection operation which selects one of the liquids L1 and L2 which is adhered to the predetermined region of the sheet T containing fibers formed from waste paper, and the control portion 330 which controls the ink jet head 310 so that the liquid selected by the selection operation is adhered to the predetermined region, the first liquid L1 contains a binder which binds fibers, and the second liquid L2 contains a pigment and a binder which binds fibers.

Accordingly, by the waste paper recycling apparatus 100, in response to a user's request, the paper quality can be changed between the regions of the sheet T, and an arbitrary number of the regions can be manufactured. For example, the regions 341, 343, 345, and 347 to which the first liquid L1 is adhered are each formed as a regular sheet, and the regions 342, 344, and 346 to which the second liquid L2 is adhered are each formed as an IJ exclusive sheet having a degree of whiteness higher than that of the regular sheet. Furthermore, when printing is performed by an ink jet printer, a sheet having a different image quality can be manufactured. As described above, by the waste paper recycling apparatus 100, sheets having different image qualities can be manufactured on demand basis. Furthermore, for example, in accordance with the basis weight of the second web W2, when the receiving portion 320 receives an input on the amount of the liquid to be ejected from the ink jet head 310, sheets having different basis weights can be manufactured.

In the waste paper recycling apparatus 100, the ink jet head 310 receives the third liquid L3 different from the liquids L1 and L2, the selection operation received by the receiving portion 320 selects one of the liquids L1, L2, and L3 which is adhered to a predetermined region, and the third liquid L3 contains a binder which binds fibers and a pigment different from that of the second liquid L2. Hence, by the waste paper recycling apparatus 100, three types of sheets having excellent paper strengths and different colors can be manufactured.

According to the waste paper recycling apparatus 100, since the ink jet head 310 includes the second nozzle holes 316 which eject the second liquid L2, the second nozzle holes 316 are aligned in the Y axis direction to form the second lines 316a, and the second lines 316a are aligned in the X axis direction, by one scanning of the ink jet head 310, a double amount of the liquid can be applied to the sheet T. Hence, in the waste paper recycling apparatus 100, compared to the case in which the second lines are not aligned in the X axis direction, a transport rate of the sheet T can be increased when the second liquid L2 is ejected to the second region 342, and hence, the productivity can be improved.

In the waste paper recycling apparatus 100, the first liquid L1 contains no pigment. Hence, in the waste paper recycling apparatus 100, for example, the regions 341, 343, 345, and 347 to which the first liquid L1 is adhered can be formed as a regular sheet.

In the waste paper recycling apparatus 100, the first liquid L1 and the second liquid L2 each contain the penetrant. Hence, in the waste paper recycling apparatus 100, compared to the case in which the penetrant is not contained, the infiltration of the liquids L1 and L2 in the sheet T can be improved.

In addition, although the number of the types of liquids ejected to the sheet T by the ink jet head 310 is set to three, the number of the types of liquids is not particularly limited as long as at least two types of liquids are used, and for example, the number of the types of liquids may be either two or four. However, the liquids each contain the binder.

In addition, although not shown in the drawing, the ink jet head 310 may adhere the liquid to the sheet T which is not yet pressurized by the pressure application portion 82. In the case described above, the sheet T may be in a web state. That is, the sheet T may be either in a state in which the pressure application is performed by the pressure application portion 82 or in a web state not yet pressurized by the pressure application portion 82.

In addition, the ink jet head 310 may adhere the liquid to the sheet T which is heated by the heating portion 84. In the case described above, the sheet T to which the liquid is adhered may be separately heated by hot wind, infrared rays, electromagnetic waves, or the like. Accordingly, the probability of cutting the sheet T by the tension between the pressure application portion 82 and the heating portion 84 can be reduced. For example, when the liquid is adhered to the region between the pressure application portion 82 and the heating portion 84, the sheet T thus wetted may not withstand the tension between the pressure application portion 82 and the heating portion 84 and may be cut thereby in some cases.

In addition, the ink jet head 310 may be not a line head type (single-pass method) and may be a multi-pass method in which the head itself moves.

1.2. Waste Paper Recycling Method

Figure 5:
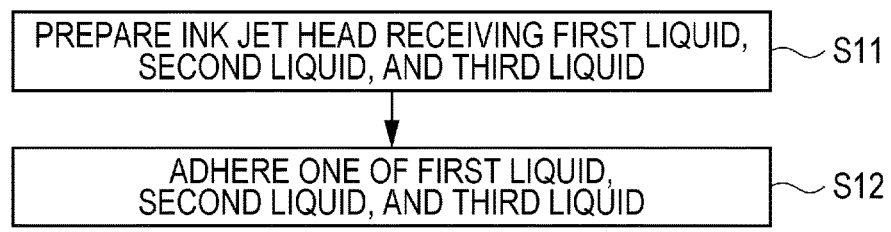
FIG. 5 is a flowchart illustrating a waste paper recycling method according to the first embodiment.

Next, a waste paper recycling method according to the first embodiment will be described with reference to the drawing. FIG. 5 is a flowchart illustrating the waste paper recycling method according to the first embodiment. The waste paper recycling method according to the first embodiment recycles waste paper, for example, using the waste paper recycling apparatus 100.

The ink jet head 310 receiving the liquids L1, L2, and L3 is prepared (Step S11). Next, one of the liquids L1, L2, and L3 is adhered to the predetermined region of the sheet T (Step S12). The other steps are the same as those described above.

1.3. Modified Example of Waste Paper Recycling Apparatus

Next, a waste paper recycling apparatus according to a modified example of the first embodiment will be described. Hereinafter, in the waste paper recycling apparatus according to the modified example of the first embodiment, points different from those of the waste paper recycling apparatus 100 according to the first embodiment will be described, and description of points thereof similar to each other will be omitted.

In the waste paper recycling apparatus 100 described above, the first liquid L1 contains no pigment. On the other hand, in the waste paper recycling apparatus according to the modified example of the first embodiment, the first liquid L1 contains a pigment different from the pigment contained in the second liquid L2 and the pigment contained in the third liquid L3. For example, the first liquid L1 contains a cyan pigment, and the second liquid L2 and the third liquid L3 each contain a white pigment. Accordingly, three types of sheets, that is, a blue first sheet, a white second sheet, and a third sheet having a degree of whiteness different from that of the second sheet, can be manufactured.

2. Second Embodiment

2.1. Waste Paper Recycling Apparatus

Figure 6:
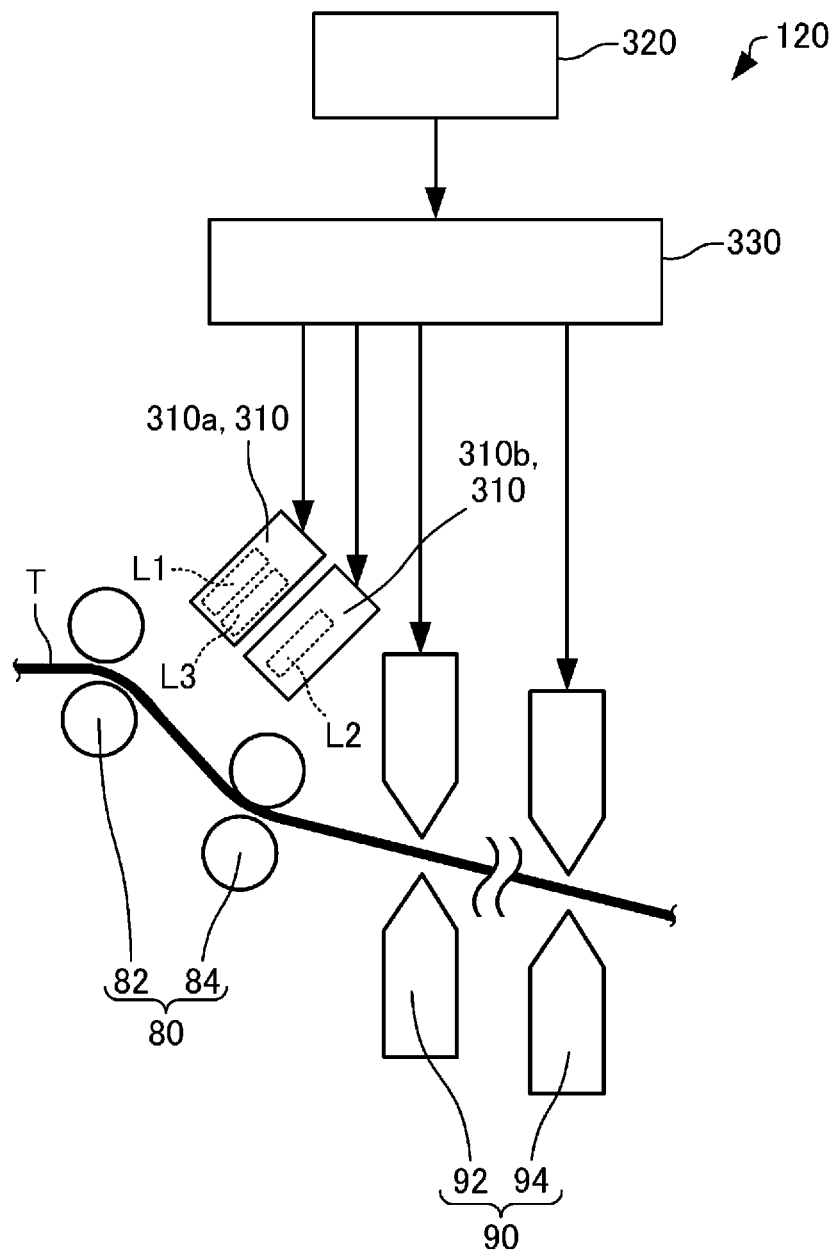
FIG. 6 is a schematic view showing a waste paper recycling apparatus according to a modified example of the first embodiment.

Next, a waste paper recycling apparatus according to a second embodiment will be described with reference to the drawing. FIG. 6 is a schematic view showing a waste paper recycling apparatus 120 according to the second embodiment. Hereinafter, in the waste paper recycling apparatus according to the second embodiment, points different from those of the waste paper recycling apparatus 100 according to the first embodiment will be described, and description of points thereof similar to each other will be omitted.

As shown in FIG. 2, the waste paper recycling apparatus 100 described above includes one ink jet head 310. On the other hand, as shown in FIG. 6, the waste paper recycling apparatus 120 includes two ink jet heads 310.

A first ink jet head (first liquid ejection device) 310a of the two ink jet heads 310 contains a first liquid L1 and a third liquid L3. The other second ink jet head (second liquid ejection device) 310b of the two ink jet heads 310 contains a second liquid L2.

A control portion 330 controls the first ink jet head 310a and the second ink jet head 310b so as to adhere the liquid selected by a selection operation received by a receiving portion 320 to a predetermined region of a sheet T. For example, when the first liquid L1 or the third liquid L3 is adhered to the predetermined region of the sheet T, the control portion 330 drives the first ink jet head 310a and does not drive the second ink jet head 310b. For example, when the second liquid L2 is adhered to the predetermined region of the sheet T, the control portion 330 drives the second ink jet head 310b and does not drive the first ink jet head 310a.

In addition, the first ink jet head 310a may contain no third liquid L3, and a third ink jet head (third liquid ejection device) not shown in the drawing may contain the third liquid L3. As described above, the number of the ink jet heads 310 and the number of the types of liquids received in the ink jet heads 310 are not particularly limited.

2.2. Waste Paper Recycling Method

Figures 7, 8:
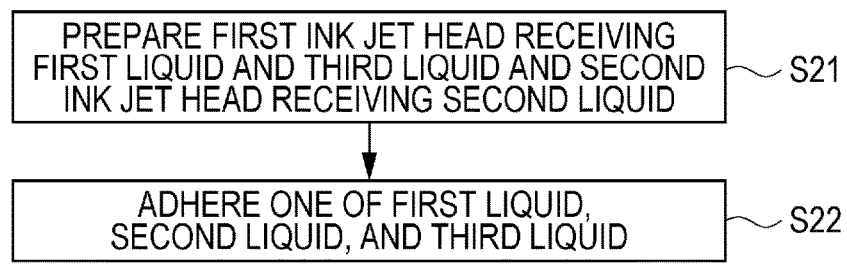
FIG. 7 is a flowchart illustrating a waste paper recycling method according to a second embodiment.
FIG. 8 is a table showing compositions of liquids.

Next, a waste paper recycling method according to the second embodiment will be described with reference to the drawing. FIG. 7 is a flowchart illustrating the waste paper recycling method according to the second embodiment. The waste paper recycling method according to the second embodiment recycles waste paper, for example, using the waste paper recycling apparatus 120.

As shown in FIG. 7, the first ink jet head 310a receiving the liquids L1 and L3 and the second ink jet head 310b receiving the second liquid L2 are prepared (Step S21). Subsequently, one of the liquids L1, L2, and L3 is adhered to the predetermined region of the sheet T (Step S22). The other steps are the same as those described above.

3. Examples

Hereinafter, with reference to Examples, the present disclosure will be described in more detail. In addition, the present disclosure is not limited to the following Examples.

By using a waste paper recycling apparatus corresponding to the waste paper recycling apparatus 100 shown in FIGS. 1 and 2, a sheet was manufactured. In an ink jet head of the waste paper recycling apparatus, four types of liquids, liquids E1, E2, E3, and E4, were received.

FIG. 8 is a table showing the compositions of the liquids E1, E2, E3, and E4. The unit of the numerical value in the table indicates percent by mass. As a binder, a styrene-butadiene copolymer was used. As a pigment, calcium carbonate, silica, or C.I. Pigment Blue 15 was used. As a penetrant, triethylene glycol monobutyl ether and "BYK-348" manufactured by BYK Japan KK, which was a silicone-based surfactant, were used. As a moisturizer, glycerin was used. With the balance being water, the total was set to 100 percent by mass.

By the waste paper recycling apparatus, the liquids E1, E2, E3, and E4 were ejected from the ink jet head, so that sheets 1 to 12 were manufactured. FIG. 9 is a table showing an IJ image quality and the degree of whiteness of each of the sheets 1 to 12. In FIG. 9, "Pulp Basis Weight" indicates the basis weight [g/m$^2$] of the sheet before the liquids E1, E2, E3, and E4 were each adhered. The IJ image quality indicates the print quality of an image printed by an ink jet printer.

A text image of 4-point characters and 10-point characters and a black solid image were printed using "PX7050FX" manufactured by Seiko Epson Corporation, and the IJ image quality thereof was then evaluated by the following criteria.

A: 4-point characters and 10-points characters are recognized without being blurred. In addition, the coloring of black is high.

B: 4-point characters are not recognized since being blurred, but 10-point characters are recognized without being blurred. In addition, the coloring of black is high.

C: 4-point characters are not recognized since being blurred, but 10-point characters are recognized without being blurred. In addition, the coloring of black is low.

D: 4-point characters and 10-point characters are both not recognized since being seriously blurred. In addition, the coloring of black is low.

The degree of whiteness was the ISO (International Organization for Standardization) whiteness, was measured by a method described in "JIS P 8148: 2001", and was evaluated according to the following criteria.

A: ISO whiteness of 90% or more
B: ISO whiteness of 75% to less than 90%
C: ISO whiteness of 60% to less than 75%
D: ISO whiteness of less than 60%

As shown in FIG. 9, sheets having various types, sizes, IJ image qualities, degrees of whiteness, and basis weights can be formed by one waste paper recycling apparatus. For example, since the sheet 1 contains the binder, a sheet having an improved paper strength can be obtained. Since the sheet 2 contains the binder and C.I. Pigment Blue 15 as the pigment, a blue sheet having an improved paper strength can be obtained. Since the sheet 3 contains the binder and calcium carbonate as the pigment, a sheet having improved paper strength, degree of whiteness, and IJ image quality can be obtained. Since the sheet 4 contains the binder and silica as the pigment, a sheet having improved paper strength, degree of whiteness, and IJ image quality can be obtained. Since the sheets 6 and 9 each have a large pulp basis weight as compared to that of the sheet 1, when the application amount of the liquid E1 is adjusted in accordance with the pulp basis weight, a sheet having a quality similar to that of the sheet 1 can be obtained. As is the case described above, since the sheets 8 and 12 each have a large pulp basis weight as compared to that of the sheet 5, when the application amounts of the liquid E1, E3, and E4 are adjusted in accordance with the pulp basis weight, a sheet having a quality similar to that of the sheet 5 can be obtained.

FIG. 10 is a table showing the production order of the sheets 1 to 12 and the numbers thereof. As Examples 1 to 7 shown in FIG. 10, various numbers of sheets can be manufactured by various production orders.

In the present disclosure, within the range in which the features and the advantages of the present disclosure are obtained, the structure may be partially omitted, or the embodiments and the modified examples may be arbitrarily used in combination. In addition, in the present disclosure, after the liquids L1, L2, and L3 are selected by the receiving portion 320, the liquids L1, L2, and L3 may be simultaneously ejected by the control portion 330.

The present disclosure is not limited to the embodiments described above and may be variously changed or modified. For example, the present disclosure includes substantially the same structure as the structure described in the embodiment. The substantially the same structure includes, for example, the structure in which the function, the method, and the result are the same as those described above, or the structure in which the object and the effect are the same as those described above. In addition, the present disclosure includes the structure in which a nonessential portion of the structure described in the embodiment is replaced with something else. In addition, the present disclosure includes the structure which performs the same operational effect as that of the structure described in the embodiment or the structure which is able to achieve the same object as that of the structure described in the embodiment. In addition, the present disclosure includes the structure in which a known technique is added to the structure described in the embodiment.

What is claimed is:

1. A waste paper recycling apparatus comprising:
   a defibrating device including a rotor and a liner around the rotor, wherein coarsely pulverized waste paper is defibrated between the rotor and the liner;
   a web forming device including a belt configured to transport a sheet containing fibers formed from the waste paper;
   a liquid ejection device which receives a first liquid and a second liquid different from the first liquid;
   a receiving portion receiving a selection operation which selects one of the first liquid and the second liquid which is adhered to a predetermined region of the sheet containing the fibers formed from the waste paper;
   a control portion which controls the liquid ejection device to adhere the liquid selected by the selection operation to the predetermined region; and
   a cutting device configured to cut the sheet to a predetermined size,
   wherein the first liquid contains a binder which binds fibers together, and
   the second liquid contains a pigment and a binder which binds fibers together.

2. The waste paper recycling apparatus according to claim 1,
   wherein the liquid ejection device receives a third liquid different from the first liquid and the second liquid,
   the selection operation selects one of the first liquid, the second liquid, and the third liquid which is adhered to the predetermined region, and
   the third liquid contains a binder which binds fibers together and a pigment different from that of the second liquid.

3. The waste paper recycling apparatus according to claim 1,
   further comprising a transport portion which transports the sheet,
   wherein the liquid ejection device includes a plurality of nozzle holes which eject the second liquid,
   the nozzle holes are aligned in a direction intersecting a transport direction of the sheet to form lines, and
   the lines are aligned in the transport direction.

4. The waste paper recycling apparatus according to claim 1, wherein the first liquid contains no pigment.

5. The waste paper recycling apparatus according to claim 1, wherein the first liquid contains a pigment different from that of the second liquid.

6. The waste paper recycling apparatus according to claim 1, wherein the first liquid and the second liquid contain a penetrant.

7. A waste paper recycling apparatus comprising:
a defibrating device including a rotor and a liner around the rotor, wherein coarsely pulverized waste paper is defibrated between the rotor and the liner;
a web forming device including a belt configured to transport a sheet containing fibers formed from the waste paper;
a first liquid ejection device which receives a first liquid;
a second liquid ejection device which receives a second liquid different from the first liquid;
a receiving portion receiving a selection operation which selects one of the first liquid and the second liquid which is adhered to a predetermined region of the sheet containing the fibers formed from the waste paper;
a control portion which controls the first liquid ejection device and the second liquid ejection device to adhere the liquid selected by the selection operation to the predetermined region; and
a cutting device configured to cut the sheet to a predetermined size,
wherein the first liquid contains a binder which binds fibers together, and
the second liquid contains a pigment and a binder which binds fibers together.

8. The waste paper recycling apparatus according to claim 7,
wherein the first liquid ejection device receives a third liquid different from the first liquid and the second liquid,
the selection operation selects one of the first liquid, the second liquid, and the third liquid which is adhered to the predetermined region, and
the third liquid contains a binder which binds fibers together and a pigment different from that of the second liquid.

9. The waste paper recycling apparatus according to claim 7,
further comprising a transport portion which transports the sheet,
wherein the first liquid ejection device includes a plurality of nozzle holes which eject the second liquid,
the nozzle holes are aligned in a direction intersecting a transport direction of the sheet to form lines, and
the lines are aligned in the transport direction.

10. A waste paper recycling method comprising:
defibrating used waste paper,
forming a sheet containing fibers from the waste paper,
preparing a liquid ejection device which receives a first liquid and a second liquid different from the first liquid,
adhering one of the first liquid and the second liquid to a predetermined region of the sheet containing the fibers formed from the waste paper, and
cutting the sheet to a predetermined size,
wherein the first liquid contains a binder which binds fibers together, and
the second liquid contains a pigment and a binder which binds fibers together.

11. A waste paper recycling method comprising:
defibrating used waste paper,
forming a sheet containing fibers from the waste paper,
preparing a first liquid ejection device which receives a first liquid and a second liquid ejection device which receives a second liquid different from the first liquid,
adhering one of the first liquid and the second liquid to a predetermined region of the sheet containing the fibers formed from the waste paper, and
cutting the sheet to a predetermined size,
wherein the first liquid contains a binder which binds fibers together, and
the second liquid contains a pigment and a binder which binds fibers together.

* * * * *